(12) United States Patent
Kellogg et al.

(10) Patent No.: US 6,866,464 B2
(45) Date of Patent: Mar. 15, 2005

(54) FOLDING RAMP

(75) Inventors: Charles Frederick Kellogg, Marion, OH (US); Larry Walter Brim, Kenton, OH (US)

(73) Assignee: Overhead Door Corporation, Farmers Branch, TX (US)

( * ) Notice: Subject to any disclaimer, the term of this patent is extended or adjusted under 35 U.S.C. 154(b) by 0 days.

(21) Appl. No.: 10/612,472

(22) Filed: Jul. 2, 2003

(65) Prior Publication Data

US 2004/0022613 A1 Feb. 5, 2004

Related U.S. Application Data

(63) Continuation-in-part of application No. 10/209,214, filed on Jul. 30, 2002.

(51) Int. Cl.[7] .................................................. B60P 1/43
(52) U.S. Cl. .................................................... 414/537
(58) Field of Search .......................... 414/537; 296/61; 188/119

(56) References Cited

U.S. PATENT DOCUMENTS

| 963,918 A | 7/1910 | Miller |
|---|---|---|
| 2,453,575 A | * 11/1948 | House .......................... 188/119 |
| 2,523,723 A | 9/1950 | Santee et al. |
| 2,611,466 A | 9/1952 | Biggert et al. |
| 2,670,484 A | 3/1954 | Bintliff et al. |
| 2,779,958 A | 2/1957 | Hodges et al. |
| 4,075,729 A | 2/1978 | Conner |
| 4,084,713 A | * 4/1978 | Rohrs et al. ............ 414/537 X |
| 4,088,235 A | 5/1978 | Thacker |
| 4,606,090 A | 8/1986 | Beard |
| 4,624,619 A | 11/1986 | Uher |
| 4,761,847 A | 8/1988 | Savage et al. |
| 4,950,124 A | * 8/1990 | Burghart et al. ............ 414/537 |
| 5,085,555 A | * 2/1992 | Vartanian ..................... 414/537 |
| 5,257,894 A | 11/1993 | Grant |
| 5,325,558 A | 7/1994 | Labreche |
| 5,440,773 A | 8/1995 | Lentini |
| 5,815,870 A | 10/1998 | Deutch et al. |
| D401,731 S | 11/1998 | Jeruss |
| 5,832,555 A | 11/1998 | Saucier et al. |
| 6,009,587 A | 1/2000 | Beeman |
| 6,536,064 B1 | 3/2003 | Swink et al. |

\* cited by examiner

*Primary Examiner*—James W. Keenan
(74) *Attorney, Agent, or Firm*—Gardere Wynne Sewell LLP

(57) ABSTRACT

A folding cargo loading/unloading ramp, particularly adapted for motor trucks, includes first and second ramp sections and an intermediate support leg assembly which is pivotally connected to the first and second ramp sections at a common hinge point. The support leg assembly includes a latch for automatically latching the support leg assembly in a working position when it is rotated from a folded position to its working position, the latch being manually actuatable to unlock the support leg assembly. Ground engaging rollers are mounted on the support legs and are braked against rotation when the ramp is in a working position. Both ramp sections and the support leg assembly include manipulating handles to facilitate movement of the ramp between a stored position and a working position.

23 Claims, 10 Drawing Sheets ns which are operable to brake the rollers against rotation when the ramp is in a working position.

The above-mentioned features together with other unique aspects of the present invention will be further appreciated by those skilled in the art upon reading the detailed description which follows in conjunction with the drawings.

FOLDING RAMP

CROSS REFERENCE TO RELATED APPLICATION

This application is a Continuation-in-Part of U.S. patent application Ser. No. 10/209,214, filed Jul. 30, 2002.

BACKGROUND

In the art of cargo loading and unloading ramps for motor vehicles, such as delivery trucks, in particular, there is an ever present need for providing a ramp which is lightweight, durable and easy to manipulate when moving the ramp between a stored position on the motor vehicle and a selected working position for loading or unloading cargo. In order to provide a ramp with a sufficiently shallow slope in its working position, folding ramps have been developed wherein the ramp is constructed to have at least two ramp sections pivotally interconnected. However, when this type of ramp is provided, it is necessary to also provide intermediate support structure generally at the pivot connection or hinge joint so that the hingedly interconnected ramp sections are properly supported in their working positions.

Moreover, it is also important that the intermediate support structure provide support for the ramp which facilitates ease of movement, when desired, but otherwise resist such movement, and be movable to a retracted position out of the way when the ramp is moved to its stored position. However, the ramp support structure must also be suitably latched in its working position to minimize the chance of collapse when the ramp is in use. It is to provide the above-mentioned desiderata in cargo vehicle loading and unloading ramps, as well as other features, that the present invention has been developed.

SUMMARY OF THE INVENTION

The present invention provides an improved loading and unloading ramp for cargo vehicles, such as motor delivery trucks and the like.

In accordance with one aspect of the present invention, a folding cargo loading and unloading ramp is provided which is easily stored in a folded position on the vehicle and may also be easily manipulated by one or more persons for movement between a stored position and a working position. In this respect the ramp of the present invention is of lightweight but durable construction and is provided with an improved arrangement of handles for moving the ramp between a working and a stored position. The ramp of the present invention is also provided with an improved arrangement of rollers, slides and locating bosses for supporting the ramp for movement between working and stored positions and for securing the ramp in a working position.

The present invention further provides a folding ramp with an improved latch mechanism which automatically latches a support leg assembly when such leg assembly is moved to its working position. The latch mechanism is easily manipulated for releasing the support leg assembly for movement when it is desired to move the ramp from a working position to a stored position.

Still further, the present invention provides an improved arrangement of intermediate support structure which includes tubular support legs provided with an improved arrangement of support rollers for contact with support surfaces when the ramp is being moved between a working position and a stored position. The support legs are provided with ground engaging rollers and associated brake mecha-

DETAILED DESCRIPTION OF PREFERRED EMBODIMENTS

Figure 1:
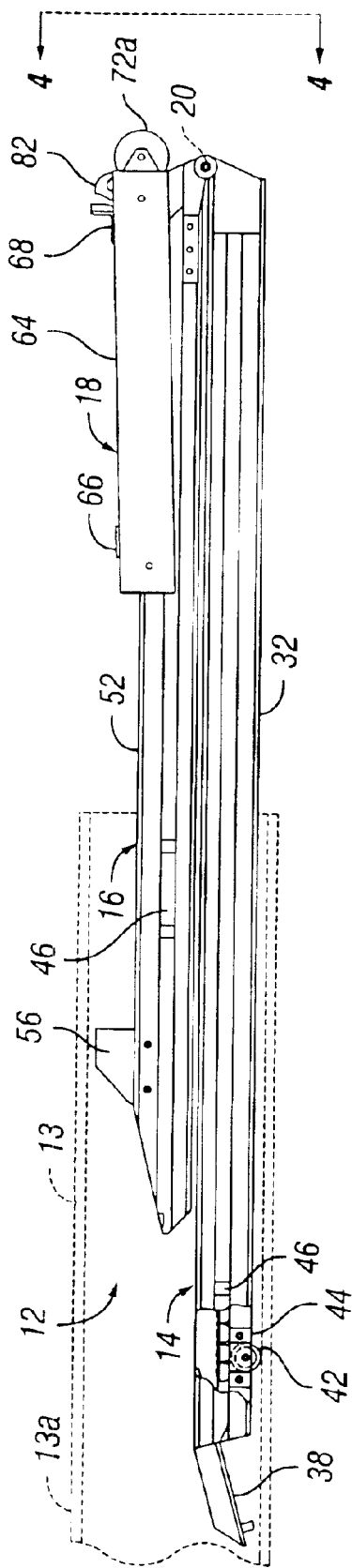
FIG. 1 is a side elevation of the folding ramp of the present invention in its folded position for storage in a suitable compartment on a motor truck, for example.

In the description which follows like parts are marked throughout the specification and drawings with the same reference numerals, respectively. The drawing figures are not necessarily to scale.

Referring to FIG. 1, the folding ramp of the present invention is generally designated by the numeral 12 and is characterized by a so-called upper ramp section 14 which is hingedly connected to a lower ramp section 16 so that the lower ramp section may be folded to the position shown in FIG. 1 for storage in a suitable compartment 13 which may comprise an open ended rectangular cross section, tubular storage box on board a motor truck, for example. By way of example a typical storage compartment may be a generally tubular box-like structure 13 disposed between the longitudinal frame rails of a motor truck chassis. As shown also in FIGS. 2 and 3, the folding ramp 12 is provided with an intermediate support leg assembly, generally designated by the numeral 18, which is hingedly connected to the upper and lower ramp sections at a common pivot axis 20, see FIGS. 1 and 8 also.

Figure 8:
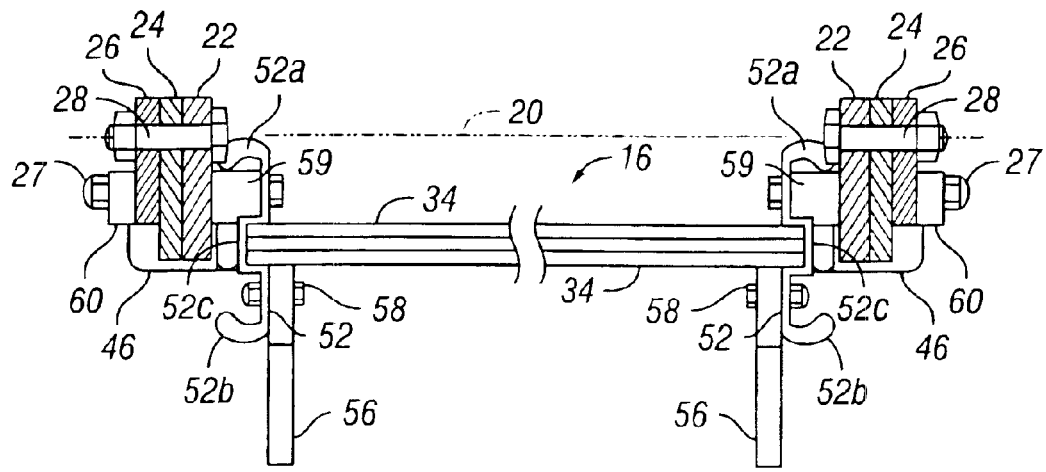
FIG. 8 is a detail section view taken generally from the line 8—8 of FIG. 3.
Figure 9:
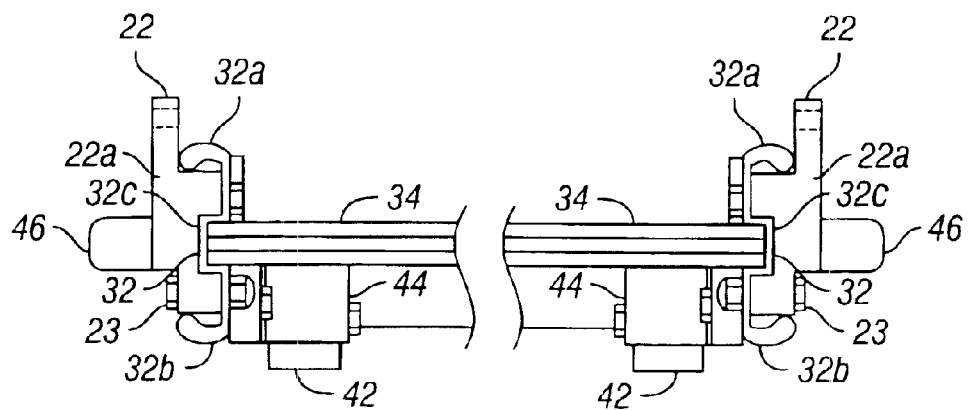
FIG. 9 is an end elevation view of the upper ramp section taken from the end which is hinged to the lower ramp section.

As shown in FIGS. 8 and 9, for example, the upper ramp section 14 is provided with spaced apart hinge bracket members 22 which are disposed adjacent spaced apart hinge bracket members 24, FIG. 8. Bracket members 24 are connected to the support leg assembly 18 and are also disposed adjacent spaced apart hinge bracket members 26 which are secured to the lower ramp section 16. Each of the hinge brackets 22, 24 and 26 is provided with a suitable pivot pin bore in which a pivot or hinge pin 28 is disposed, as shown in FIG. 8, to provide the common hinge or pivot axis 20 between the upper and lower ramp sections and the support leg assembly.

Figure 2:
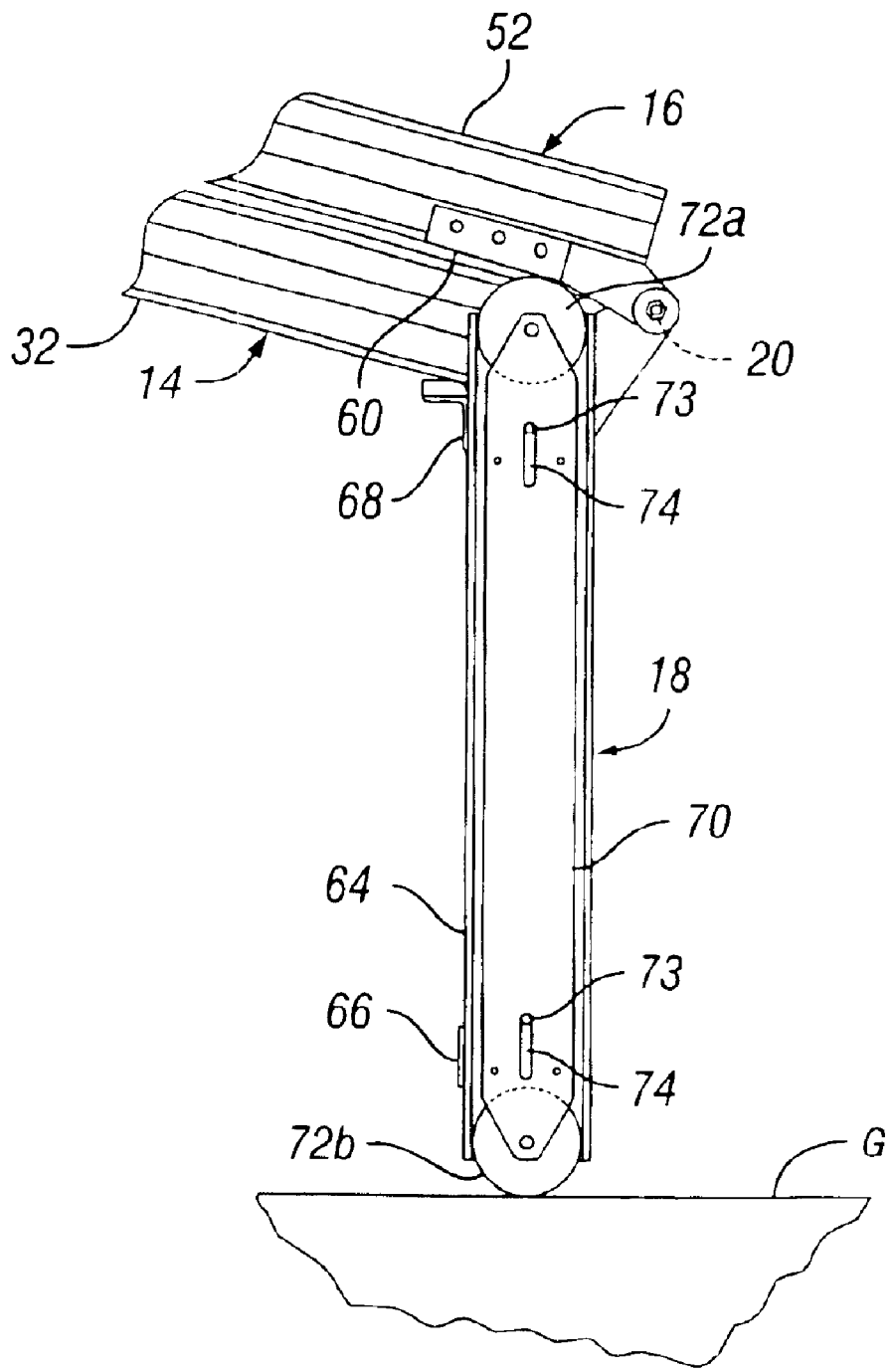
FIG. 2 is a detail side elevation of the folding ramp shown in FIG. 1 with the intermediate support leg assembly rotated to a working position.
Figure 3:
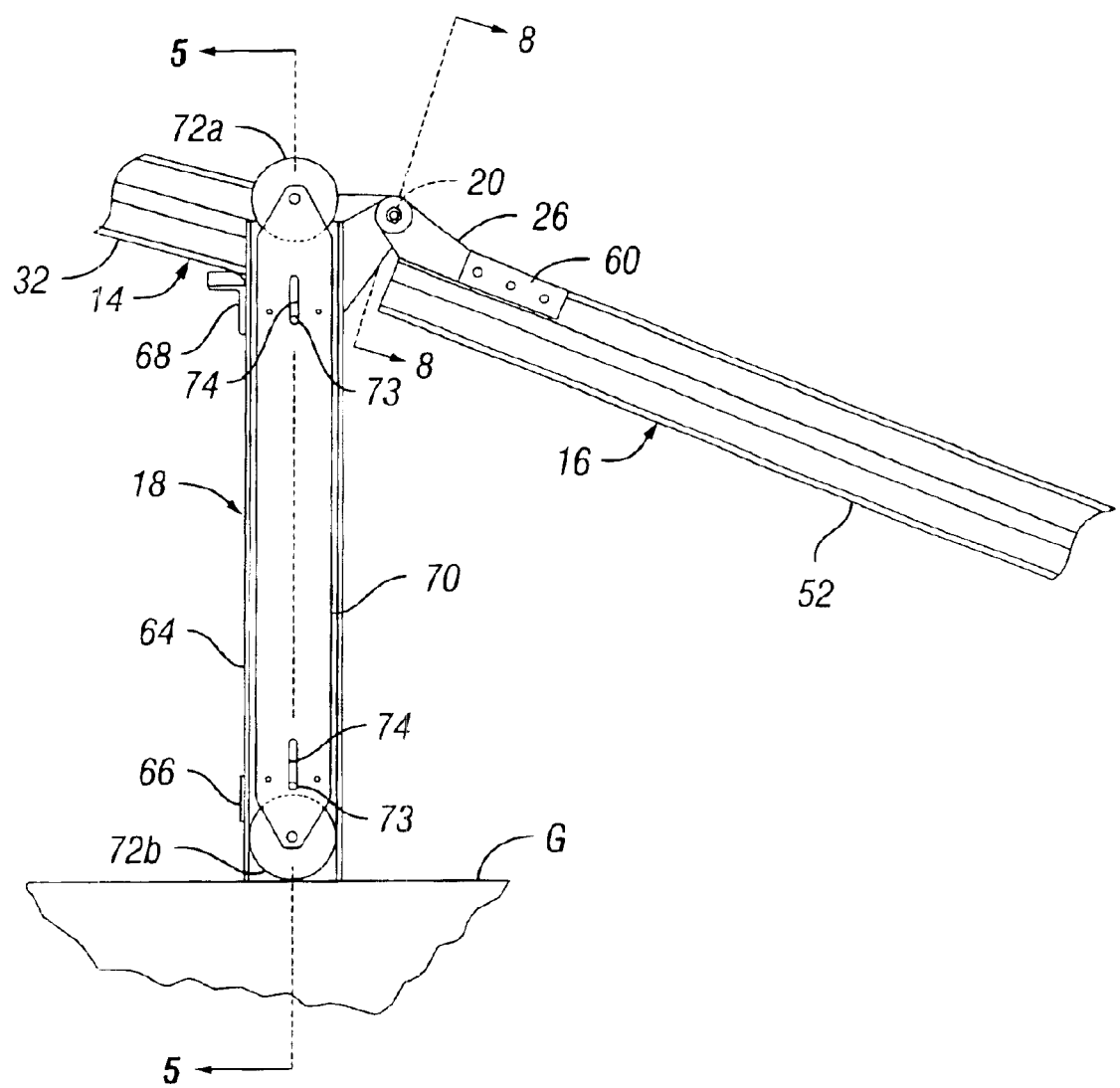
FIG. 3 is a view similar to FIG. 2 showing the lower ramp of the folding ramp rotated to a working position.

Accordingly, the folding ramp 12 may be removed from the aforementioned storage position to a point wherein the leg assembly 18 may be swung from the position shown in FIG. 1 to the position shown in FIG. 2 followed by the step of swinging the upper ramp section 16 from the position shown in FIGS. 1 and 2, to the position shown in FIG. 3.

Figure 6:
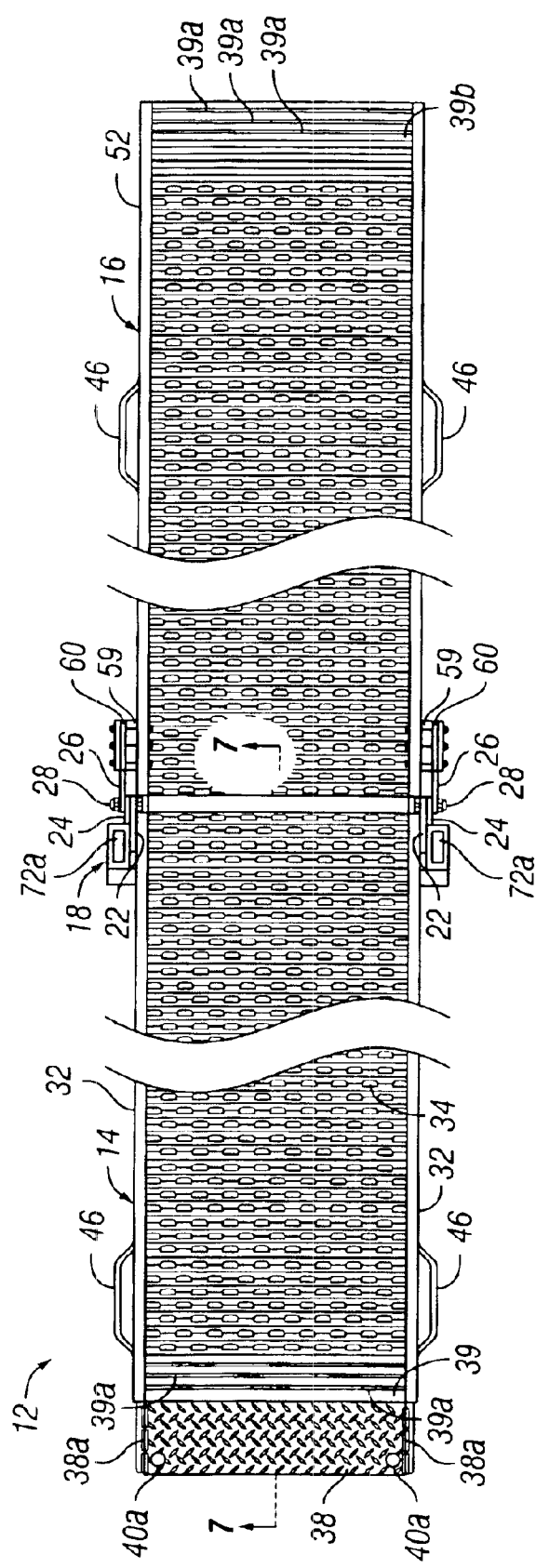
FIG. 6 is a plan view of the folding ramp in an unfolded, working position.
Figure 7:
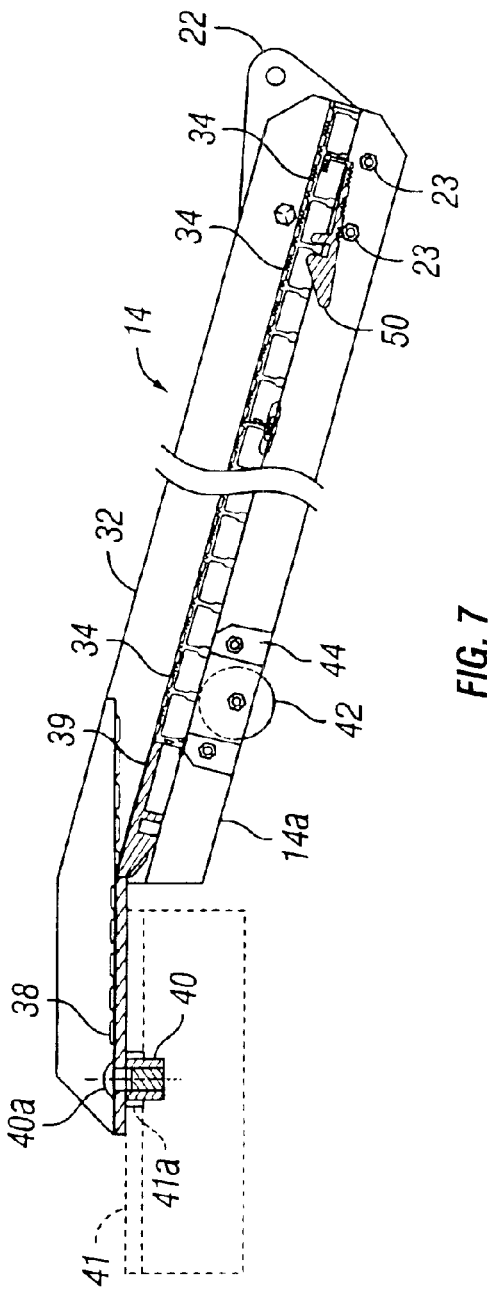
FIG. 7 is a detail section view of the upper ramp section taken generally from the line 7—7 of FIG. 6.

Referring now to FIGS. 6, 7 and 9, the upper ramp section 14 is characterized by opposed elongated rail members 32 between which are disposed side by side perforated deck plates 34 forming the ramp deck surface. The rails 32 may be formed of extruded metal, such as aluminum alloy, for example, and the deck plates 34 may also be fabricated of stamped, cast, or extruded aluminum plate, for example. The rails 32, as shown in FIG. 9, have opposed curved flanges 32a and 32b and a recessed web 32c for receiving the side edges of the deck plates 34, respectively, as shown. The deck plates 34 may be secured to the rails 32 by welding or by mechanical fasteners.

The upper end of the ramp section 14 is provided with a fixed, plate-like lip member 38 which includes opposed side edge flanges 38a secured to the opposed rails 32 by welding, for example. The lip 38 is provided with spaced apart, depending, ramp locating bosses 40 which may be disposed in corresponding boss receiving holes 41a in a vehicle load deck 41, see FIG. 7, for securing the upper end of the ramp 12 in a working position. Bosses 40 may comprise plastic threaded nut members secured respectively to threaded round head screws 40a, FIGS. 6 and 7. A suitable tread plate 39, including spaced apart antiskid tread members 39a, may be interposed the lip 38 and the first deck plate 34, as shown in FIGS. 6 and 7. Tread plate 39 may be secured to the rails 32 in the same manner as the deck plates 34.

As shown in FIGS. 7 and 9, the upper ramp section 14 is also provided with spaced apart support rollers 42 which are rotatably supported on ramp section 14 adjacent its upper end by suitable channel shaped brackets 44. The brackets 44 are suitably secured to respective ones of the rails 32, as shown in FIGS. 7 and 9. By locating the support rollers 42 adjacent the upper end of the upper ramp section 14, movement of the ramp 12 into and out of its storage position is facilitated.

Referring further to FIGS. 6 and 9, the upper ramp section 14 is also provided with a first pair of opposed ramp manipulating handles 46 disposed adjacent the upper end of the upper ramp section and secured, respectively, to respective ones of the rails 32. The location of the handles 46 together with other manipulating handles to be described further herein is advantageous for manipulating the ramp 12 when moving the ramp between working and stored positions. As further shown in FIG. 9, the hinge brackets 22 for the ramp section 14 each include a boss portion 22a which fits between the flanges 32a and 32b of the side rails 32. The hinge brackets 22 are suitably releasably secured to the side rails 32 by conventional threaded fastener assemblies 23, FIG. 9, but may also be welded to the side rails.

Referring again to FIG. 7, the upper ramp section 14 includes a latch catch member 50 mounted on the underside of one of the deck plates 34 comprising the end deck plate at the end of the ramp section 14 opposite the lip 38. Catch 50 is preferably centered between rails 32. The purpose of the catch 50 will be described in further detail herein.

Referring further to FIGS. 6 and 8, the lower ramp section 16 is also characterized by opposed elongated rail members 52 substantially like the rail members 32 but generally of shorter length and including opposed flanges 52a and 52b with an intermediate web part 52c having a channel formed therein, as shown in FIG. 8, for receiving opposite ends of side by side deck plates 34. The deck plates 34 of the ramp section 16 are secured to the rails 52 in the same manner as adjacent side by side deck plates 34 are secured to the rails 32. The lower ramp section 16 is also provided with opposed generally fin-like slide members 56 which are secured to the rails 52 by suitable threaded fastener assemblies 58, as shown in FIG. 8, as well as FIG. 1. The replaceable slides 56 are preferably formed of a plastic, such as polypropylene, and are operable to engage the top wall 13a, FIGS. 1 and 4, of box or compartment 13 when the ramp 12 is being moved into or out of such box and to facilitate such movement. Thanks to the provision of the slides 56 of a material such as polypropylene, the slides provide just enough frictional resistance as they engage wall 13a to allow ease of management of the ramp as it is moved in and out of enclosure 13. Slides 56 are also dimensioned such as to engage top wall 13a without allowing ramp 12 to tilt excessively with respect to enclosure 13 as it is moved in or out of such enclosure.

As further shown in FIGS. 6 and 8, the opposed hinge brackets 26 for the ramp section 16 are releasably secured to the rails 52 by suitable threaded fastener assemblies 27 and are spaced from the rails 52 by suitable spacer members 59. Fasteners 27 also secure opposed cam plates 60 to the side rails 52. Cam plates 60 are disposed for engagement with telescoping members of the leg assembly 18 as will be described further herein. As further shown in FIGS. 6 and 8, the lower ramp section 16 has a distal lip member comprising an antiskid plate 39b disposed between and secured to the rails 52. The lower ramp section 16 further includes a second set of opposed handles 46 secured to the outside surfaces of the opposed rails 52 in the same manner that the first mentioned handles 46 are secured to the rails 32 of ramp section 14.

Figure 4:
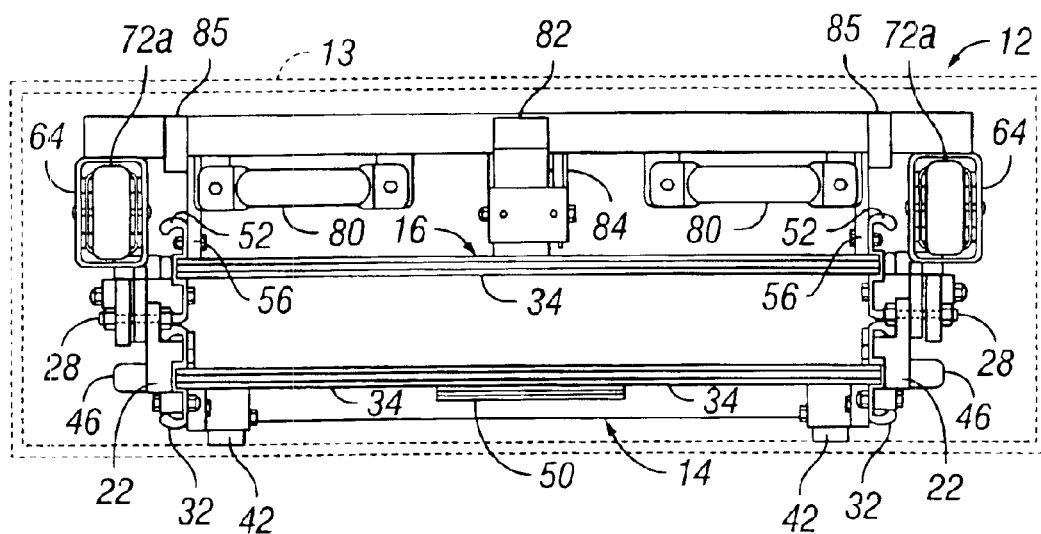
FIG. 4 is a view taken generally from the line 4—4 of FIG. 1.
Figure 5:
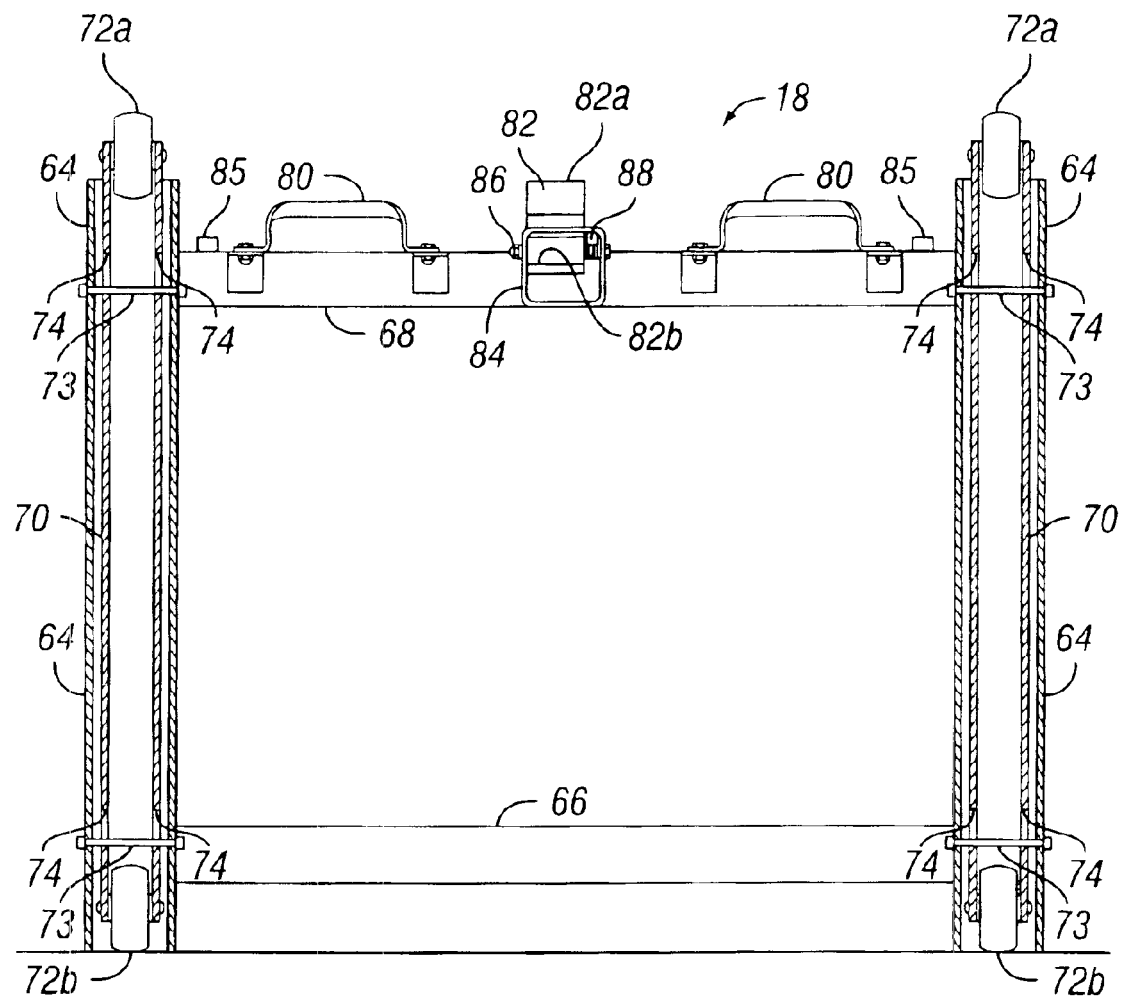
FIG. 5 is a detail view of the ramp intermediate support leg assembly taken generally from the line 5—5 of FIG. 3.

Referring now primarily to FIGS. 4 and 5, the intermediate support leg assembly 18 is characterized by two spaced apart, elongated, generally rectangular tube-like support leg members 64 which are interconnected by frame members 66 and 68. Within each support member 64 is disposed an elongated telescopically moveable tubular support leg 70 which includes rollers 72a and 72b suitably supported thereon at opposite ends thereof. Each support leg 70 is also preferably characterized as a rectangular cross section tubular member and is disposed within a tubular leg member 64 for sliding movement over a limited distance as determined by two spaced apart support pins 73 which are secured to the leg member 64, respectively, and extend through elongated slots 74 formed in the respective tubular leg members 70. Accordingly, the tubular leg members 70 are disposed for limited sliding or telescoping movement within the leg members 64 between the position shown in FIGS. 3 and 5 and the position shown in FIG. 2. In fact, the leg members 70 are moved into the position shown in FIG. 2 relative to the leg members 64 by engagement of rollers 72a, respectively, with the respective cam members 60 supported on the ramp section 16 adjacent the end which supports the hinge brackets 26.

Accordingly, when the ramp 12 is withdrawn from its storage position, initially, the leg assembly 18 is rotated from the position shown in FIG. 1 to the position shown in FIG. 2. When this action takes place the rollers 72a engage the respective cams 60 forcing the leg members 70 to extend downward relative to the leg members 64 so that rollers 72b engage the ground G, as shown in FIG. 2. However, when the ramp section 16 is rotated from the position shown in FIG. 2 to the position shown in FIG. 3, the cams 60 move out of engagement with rollers 72a and the weight of the ramp 12 causes the leg members 64 to move downward relative to the leg members 70 so that the lower distal ends of the leg members 64 engage the ground G and rollers 72b are retracted upwardly within the leg members 64, as shown in FIGS. 3 and 5.

Referring further to FIGS. 4 and 5, the support leg assembly 18 advantageously includes spaced apart ramp manipulating handles 80 which are supported on the frame member 68, as shown. In the folded condition of the ramp assembly 12, as shown in FIG. 1, the handles 80 face a person addressing the folded ramp 12 and are readily accessible for pulling the ramp 12 out of its boxlike compartment or enclosure 13 or returning the ramp to the enclosure.

Figure 10:
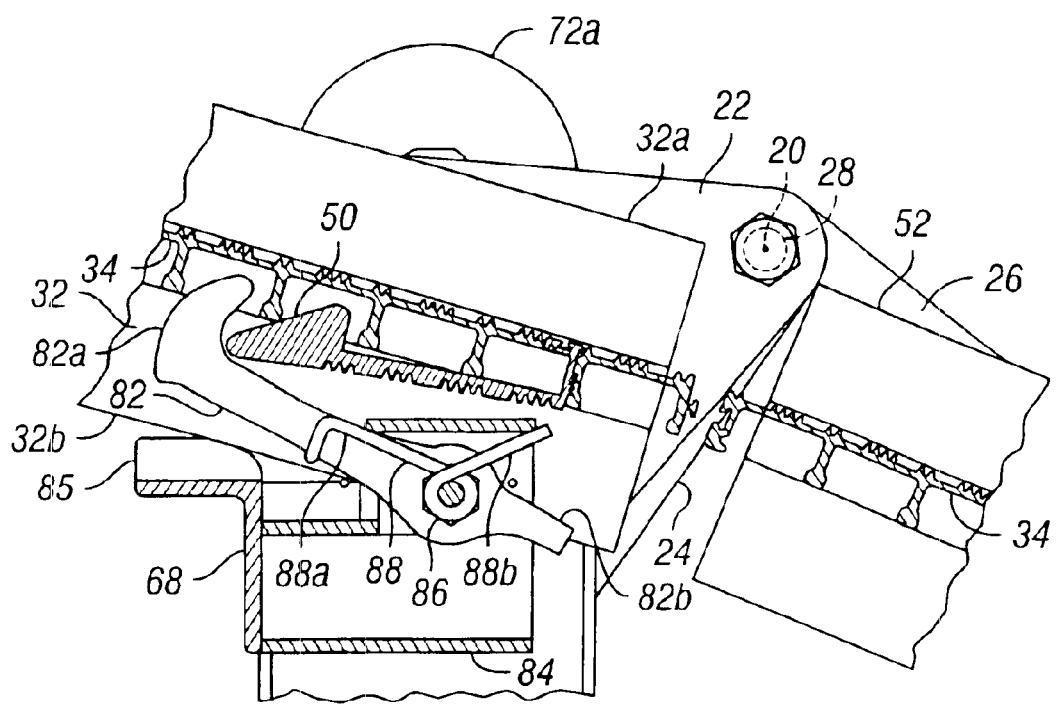
FIG. 10 is a detail section view of the latch mechanism for the intermediate support leg assembly and is taken generally from the same line as the view of FIG. 7.

Still further, as shown in FIGS. 4, 5 and 10, the folding ramp 12 of the present invention includes an improved latch mechanism for latching the intermediate support leg assembly 18 in the working position shown in FIGS. 2 and 3. The latch mechanism includes a latch member 82 which is pivotally mounted on a support bracket 84 supported on frame member 68 generally midway between legs 64. Support bracket 84 comprises a generally rectangular tube shaped member which is suitably mounted on frame member 68 and supports a pivot pin 86, FIG. 10, for supporting the latch member 82 for pivotal movement thereabout and on bracket 84. A torsion coil spring 88, FIG. 10, is supported on pin 86 and includes a first arm 88a engaged with latch member 82 and a second arm 88b engaged with support bracket 84, as illustrated in FIG. 10. Latch member 82 includes a hook part 82a disposed on one side of pivot pin 86 and a handle part 82b disposed opposite the hook part and which may be manually grasped to pivot the latch member 82 about the pin 86 against the bias of spring 88.

Accordingly, when the leg assembly 18 is rotated to the position shown in FIGS. 2, 3 and 10, latch member 82 is biased by spring 88 to automatically engage catch 50 as the leg assembly is swung into the position shown in FIGS. 2, 3 and 10. However, when it is desired to rotate the support leg assembly 18 from the position shown in FIG. 2 back to the position shown in FIG. 1, the latch member 82 may be grasped at the handle part 82b and rotated against the bias of spring 88 (in a counterclockwise direction, viewing FIG. 10) so that the hook part 82a will move clear of the catch 50 as the leg assembly is rotated to the position shown in FIG. 1.

Operation of the ramp 12 is believed to be readily understandable from the foregoing description. However, briefly, the ramp 12 may be removed from its storage compartment or enclosure 13 by grasping one or more of the handles 80 and sliding the ramp, in its folded position, partially from the compartment until the leg assembly 18 may be rotated to its working position. Movement of the ramp assembly in and out of the compartment 13 is facilitated by the rollers 42 and slide members 56. Prior to removing the ramp 12 completely from the compartment 13, and while the ramp remains supported in the compartment, the leg assembly 18 is rotated to the position shown in FIG. 2 so that the rollers 72b are operable to support the ramp when it is removed substantially from the compartment.

Once the ramp 12 is at least partially removed from the compartment 13, the handles 80 and/or the handles 46 may be grasped to further assist in moving the ramp. When the leg assembly 18 is rotated to the position of FIG. 2, the latch 82 automatically engages catch 50 to lock the leg assembly in the position of FIG. 2 to prevent inadvertent rotation which would possibly result in the ramp collapsing or falling to the ground G. Opposed stop members 85 are mounted on frame member 68, FIGS. 4 and 5, and are engageable with flanges 32b of rails 32, FIG. 10, to limit movement of leg assembly 18 to the working position shown. Once the leg assembly 18 is in a ramp supporting position, the ramp 12 may be moved further from the compartment 13 until the lip 38 rests on the edge of the compartment or the upwardmost end of the ramp section 14 rests on the compartment. The ramp operator may then lift the upper end of the ramp section 14 to position it on the load bed 41, generally in the position as shown in FIG. 7, for example, with bosses 41 disposed in the cooperating receiving bores 41a, one shown in FIG. 7. Alternatively, the uppermost end 14a, FIG. 7, of the ramp section 14 may simply rest on the load deck 41 if a working angle of the ramp is such as to allow the lip 38 to essentially be flush with the surface of the load deck.

After positioning the ramp 12 as just described, the ramp section 16 may be rotated from the position shown in FIGS. 1 and 2 to the position shown in FIG. 3 by grasping one of the handles 46 on ramp section 16, for example. The handles 46 are preferably placed approximately sixty percent of the length of the ramp section 16 from the hinge pivot axis 20 between the ramp section 16 and the ramp section 14. As the ramp section 16 is moved to the position shown in FIG. 3, the cams 60 move away from the rollers 72a allowing the support leg members 70 to move telescopically upward with respect to the support leg members 64 whereby the support leg members 64 then move into engagement with the ground G as shown in FIG. 3. The ramp 12 is now ready for use for loading and/or unloading cargo with respect to the load deck 41.

When it is desired to replace the ramp 12 within compartment 13, the process just described is essentially reversed, that is, the ramp section 16 is folded back to the position shown in FIG. 1 or 2 and the upper end of ramp section 14 is placed partially back in the compartment or enclosure 13 preferably to a point wherein the slides 56 are operable to engage top wall 13a and prevent the ramp from falling to the ground G when the leg assembly 18 is folded back to its storage position. The latch handle part 82b is then grasped by the ramp operator to rotate the latch 82 out of its locking position with respect to the catch 50, at which time the leg assembly 18 may be rotated back to the position shown in FIG. 1. Prior to unlocking the leg assembly 18 from its working position shown in FIGS. 2 and 3, the upper end of the ramp section 14 may be, as described, at least partially positioned back within the storage compartment 13 so that the ramp 12 is supported within the storage compartment prior to retraction of the leg assembly 18 to its non-working position, as shown in FIG. 1. The latch 82 is advantageously centered between opposite sides of the ramp 12 so that it may be grasped from either side of the ramp during operation to fold the leg assembly to its storage position.

Figure 11:
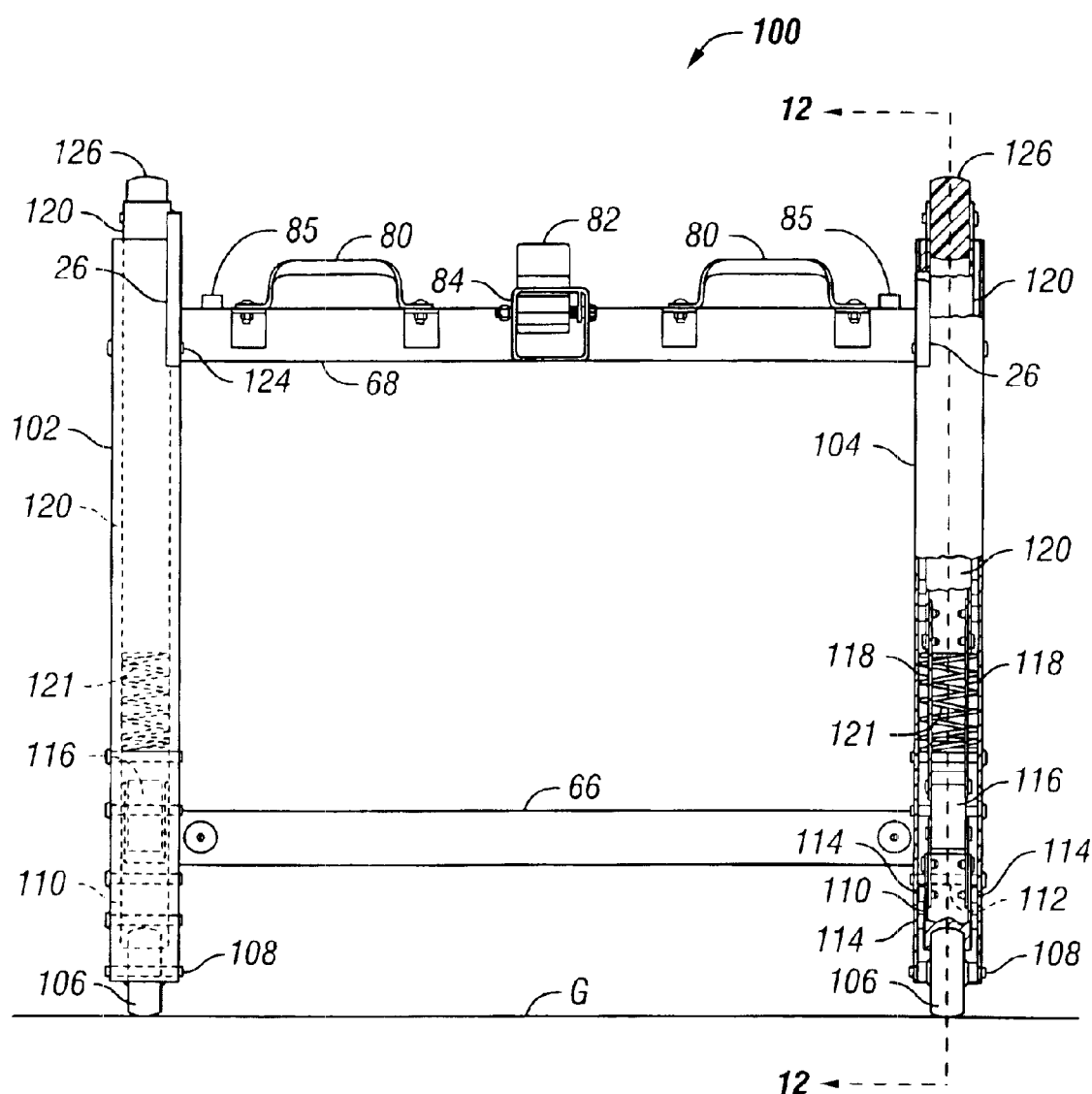
FIG. 11 is a detail view showing an alternate embodiment of an intermediate support leg assembly for the ramp of the present invention, partially sectioned.
Figure 12:
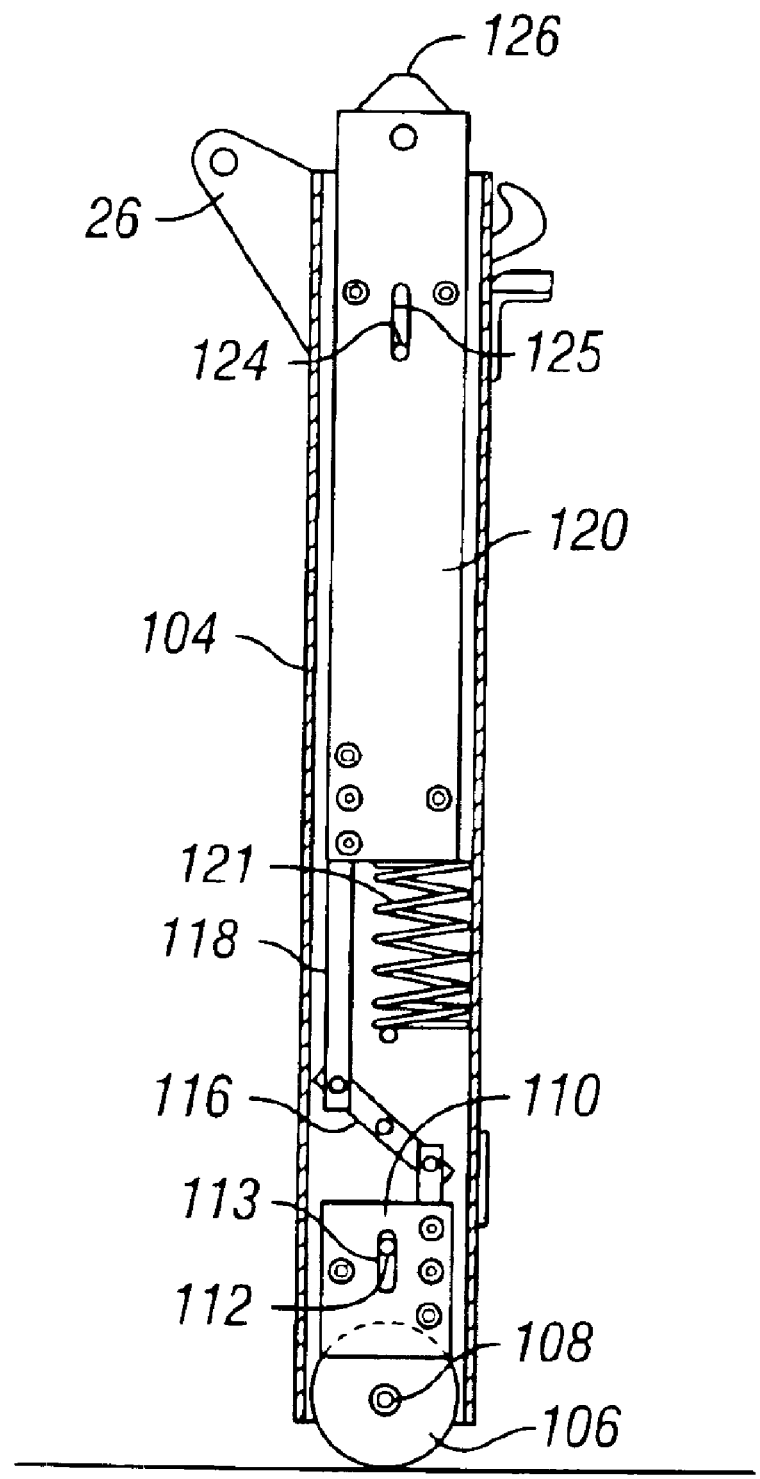
FIG. 12 is a detail section view taken generally along the line 12—12 of FIG. 11.

Referring now to FIGS. 11 and 12, an alternate embodiment of an intermediate support leg assembly is illustrated and generally designated by the numeral 100. The support leg assembly 100 may be connected to the ramp sections 14 and 16 in place of the support leg assembly 18 in substantially the same manner as the ramp sections are connected to the support leg assembly 18. The support leg assembly 100 is, except as described herein, essentially like the support leg assembly 18 and includes spaced apart generally rectangular cross section tubular leg members 102 and 104 which are substantially like the leg members 64 of the leg assembly 18. Leg members 102 and 104 are interconnected by frame members 66 and 68 in the same manner as for the support leg assembly 18. They support leg assembly 100 also includes spaced apart pivot brackets 26 secured to the respective tubular leg members 102 and 104, again in the same manner as brackets 26 are connected to the legs 64 for the support leg assembly 18.

Referring further to FIGS. 11 and 12, each of the tubular support legs 102 and 104 is adapted to support a roller 106 partially therewithin as shown in the drawing figures and mounted for rotation on suitable axle members 108, respectively. The rollers 106 are supported for rotation on the respective legs 102 and 104 but do not retract within the legs as with the embodiment shown in FIGS. 4 and 5. Each roller 106 is operable to be engaged by a generally rectangular block shaped brake shoe 110 as shown by way of example in FIG. 12 for the roller 106 mounted on the support leg 104. Brake shoes 110 are slidably mounted within the respective tubular legs 102 and 104 by support pins 112 for limited axial movement therein, respectively. Pins 112 project through elongated slots 113 formed in brake shoes 112, as shown by example in FIG. 12. Each brake shoe 110 is supported for sliding movement in the leg 102 or 104 in a standoff position from the walls of the leg by suitable bearing pads 114, as shown in FIG. 11. Brake shoes 110 are each connected to a suitable linkage, including a link 116 mounted for pivotal movement, as shown, and an axially extending link 118. Link 118 is connected to a brake actuator member 120 comprising an elongated rectangular cross section tube telescopically supported within respective ones of the leg members 102 and 104. Each brake actuator member 120 is mounted for limited sliding movement by a transverse pin 124 mounted on each of the legs 102 and 104, as shown by example in FIG. 12. The pins 124 project through cooperating elongated slots in the respective actuator members 120, as indicated by slot 125 in FIG. 12, by way of example. Actuator members 120 are biased upwardly, viewing FIGS. 11 and 12, by coil springs 121, suitably supported within the respective legs 102 and 104. The upper end of each actuator member 120 supports a contact block 126, preferably formed of a suitable durable plastic, for engagement with the respective cam plates 60 of the ramp section 16.

Accordingly, with the ramp 12 modified to include the support leg assembly 100, in place of the support leg assembly 18, when the ramp is withdrawn from its storage position, the leg assembly 100 is rotated from the same position as that of the leg assembly 18, shown in FIG. 1, to a position corresponding to the position of the leg assembly 18, as shown in FIG. 2. When this action takes place, the blocks 126 engage the respective cam plates 60 forcing the brake actuator members 120 downwardly with respect to the tubular leg members 102 and 104, against the bias of the compression springs 121 mounted within the respective leg members, to effect movement of the brake shoes 110 out of forcible engagement with the respective rollers 106. In this way the ramp 12 may be moved into a working position since the rollers 106 are free to rotate. However, when the ramp section 16 is rotated from a position corresponding to that shown in FIG. 2 to a position corresponding to that shown in FIG. 3, the cam plates 60 move out of engagement with the blocks 126 and the compression springs 121 urge the brake actuator members 120 upwardly, viewing FIGS. 11 and 12, effecting rotation of the links 116 to forcibly urge the brake shoes 110 into braking engagement with the rollers 106 whereby the support leg assembly 100 is not free to move with respect to the ground G and thus supports the ramp in its working position.

When the ramp section 16 is moved back to its folded position, the cam plates 60 forcibly engage the blocks 126 and effect movement of the brake shoes 110 away from forcible engagement with the rollers 106 thereby permitting movement of the ramp and the support leg assembly 100 for replacement to a stored position or for repositioning to a different working position.

The construction of the ramp 12, including the support leg assemblies 18 and 100, is believed to be within the purview of one skilled in the art based on the foregoing description and the drawings. Conventional engineering materials may be used to construct the various parts of the ramp 12 and which are known to those skilled in the art of cargo loading and unloading ramps.

Although preferred embodiments of the invention have been described in detail herein, those skilled in the art will recognize that various substitutions and modifications may be made without departing from the scope and spirit of the appended claims.

What is claimed is:

1. A portable cargo loading/unloading ramp for freight trucks comprising:

a first ramp section;

a second ramp section hingedly connected to said first ramp section;

a support leg assembly comprising two spaced apart leg members connected to each other and hingedly connected to at least one of the ramp sections and operable to be moved between a working position and a stored position of said support leg assembly;

rollers mounted on respective ones of said leg members, a brake shoe member mounted on each of said leg members and operable to be forcibly engaged with said rollers, respectively, to effect braking action thereon;

brake actuator members operably connected to said brake shoe members, respectively, and engageable with cam means on said second ramp section to effect operation of said brake shoe members to release forcible engagement with said rollers, respectively, in response to movement of said second ramp section from a working position to a stored position of said second ramp section; and a latch mechanism disposed on said support leg assembly and including a latch member mounted for movement for engagement with a catch mounted on said first ramp section for locking said support leg assembly in said working position of said support leg assembly and responsive to manipulation by an operator of said ramp to move to a position for unlatching said support leg assembly for rotation to said stored position of said support leg assembly.

2. The ramp set forth in claim 1 including:

support rollers mounted on said first ramp section adjacent an end of said first ramp section opposite an end which is hingedly connected to said second ramp section.

3. The ramp set forth in claim 1 including:

at least one manipulating handle disposed on said support leg assembly for grasping by an operator of said ramp to move said ramp.

4. The ramp set forth in claim 1 including:

at least one manipulating handle disposed on said second ramp section for grasping by an operator of said ramp for moving said second ramp section between said stored position of said second ramp section and said working position of said second ramp section.

5. The ramp set forth in claim 1 including:

at least one manipulating handle supported on said first ramp section adjacent an end of said first ramp section opposite an end which is hingedly connected to said second ramp section for manipulating said first ramp section.

6. The ramp set forth in claim 5 wherein:

said first ramp section includes manipulating handles mounted opposite each other on opposite sides of said first ramp section.

7. The ramp set forth in claim 1 wherein:

at least one of said ramp sections is formed by spaced apart, elongated, substantially parallel support rails and a plurality of deck plates disposed between said rails and secured thereto, respectively, to form said at least one ramp section.

8. The ramp set forth in claim 7 wherein:

said rails comprise opposed flanges, a web and a channel formed in said web for receiving opposite sides of said deck plates.

9. The ramp set forth in claim 8 wherein:

said flanges of said rails are formed to have a continuous curved shape to facilitate manipulating said ramp by operating personnel.

10. The ramp set forth in claim 1 including:

ramp locating bosses disposed on said first ramp section adjacent one end thereof.

11. The ramp set forth in claim 1 including:

spaced apart slides disposed on said second ramp section for engagement with a wall of a storage compartment during movement of said ramp therein.

12. A portable cargo loading/unloading ramp for freight trucks comprising:

a first ramp section;

a second ramp section hingedly connected to said first ramp section and movable between a working position and a stored position of said second ramp section;

a support leg assembly hingedly connected to at least one of the ramp sections and movable independent of said second ramp section between a working position of said support leg assembly for supporting said ramp and a stored position of said support leg assembly;

roller means mounted on said support leg assembly and engageable with a support surface in said working position of said support leg assembly;

a brake shoe on said support leg assembly engageable with said roller means;

a brake actuator responsive to movement of said second ramp section to said working position of said second ramp section to cause braking engagement of said brake shoe with said roller means; and manipulating handle means disposed on at least one of said ramp sections and said support leg assembly for manipulating said ramp between working and stored positions of said ramp.

13. The ramp set forth in claim 12 including:

support rollers mounted on said first ramp section adjacent an end of said first ramp section opposite an end which is hingedly connected to said second ramp section.

14. The ramp set forth in claim 12 wherein:

said handle means comprises at least one manipulating handle disposed on said support leg assembly for grasping by an operator of said ramp to move said ramp between said stored position and said working position of said ramp.

15. The ramp set forth in claim 12 wherein:

said handle means comprises at least one manipulating handle disposed on said second ramp section for grasping by an operator of said ramp for moving said second ramp section between said stored position of said second ramp section and said working position of said second ramp section.

16. The ramp set forth in claim 12 wherein:

said handle means comprises at least one manipulating handle supported on said first ramp section adjacent an end of said first ramp section opposite an end which is hingedly connected to said second ramp section for manipulating said first ramp section.

17. The ramp set forth in claim 16 wherein:

said first ramp section includes manipulating handles mounted opposite each other on opposite sides of said first ramp section.

18. The ramp set forth in claim 12 including:

ramp locating bosses disposed on said first ramp section adjacent one end thereof.

19. The ramp set forth in claim 12 including:

spaced apart slides disposed on said second ramp section for engagement with a wall of a storage compartment during movement of said ramp therein.

20. A portable cargo loading/unloading ramp for freight trucks comprising:

a first ramp section;

a second ramp section hingedly connected to said first ramp section and movable between a folded position overlying said first ramp section and a working position of said second ramp section; and a support leg assembly hingedly connected to at least one of said ramp sections and adapted to be moved independent of said second ramp section, said support leg assembly including ground engaging rollers disposed thereon and roller brake mechanism responsive to movement of said second ramp section to said working position of said second ramp section to apply braking forces to said rollers.

21. The ramp set forth in claim 20 wherein:

said rollers are mounted on respective ones of two spaced apart support leg members, and said brake mechanism comprises a brake shoe member mounted on respective ones of said support leg members and operable to be forcibly engaged with said rollers, respectively, to effect braking action thereon, and brake actuator members operably connected to said brake shoe members, respectively, and engageable with cam means on said second ramp section to effect operation of said brake shoe members to release forcible engagement with said rollers, respectively, in response to movement of said second ramp section with respect to said first ramp section.

22. The ramp set forth in claim 21 wherein:

said support leg members comprise elongated tubular members, respectively, and said brake shoe members and said brake actuator members are slidably mounted on said support leg members for movement between brake engaged and disengaged positions.

23. The ramp set forth in claim 22 including:

spring means engaged with said brake actuator members for biasing said brake shoe members into engagement with said rollers, respectively.

* * * * *